United States Patent

Kunitake et al.

[11] Patent Number: 6,078,689
[45] Date of Patent: Jun. 20, 2000

[54] IMAGE INFORMATION ENCODING DEVICE

[75] Inventors: Setsu Kunitake; Shunichi Kimura, both of Nakai-machi, Japan

[73] Assignee: Fuji Xerox Co., Ltd., Tokyo, Japan

[21] Appl. No.: 09/080,145

[22] Filed: May 18, 1998

[30] Foreign Application Priority Data

Jun. 2, 1997 [JP] Japan .................................. 9-143748

[51] Int. Cl.[7] .................................................. G06K 9/36
[52] U.S. Cl. ............................................................ 382/232
[58] Field of Search .................................. 382/232–236, 382/238–248, 250–254; 348/384, 390, 400–416, 420, 421, 699

[56] References Cited

U.S. PATENT DOCUMENTS

| | | | |
|---|---|---|---|
| 5,282,255 | 1/1994 | Bovik et al. | 382/232 |
| 5,592,228 | 1/1997 | Dachiku et al. | 348/416 |
| 5,734,677 | 3/1998 | Liew et al. | 382/239 |
| 5,787,239 | 7/1998 | Horie et al. | 382/232 |
| 5,815,601 | 9/1998 | Katata et al. | 382/232 |
| 5,963,673 | 10/1999 | Kodama et al. | 382/239 |
| 5,978,515 | 11/1999 | Katata et al. | 382/243 |
| 5,991,458 | 11/1999 | Kunitake et al. | 382/254 |

FOREIGN PATENT DOCUMENTS

| | | |
|---|---|---|
| 5-292326 | 11/1993 | Japan . |
| 6-6610 | 1/1994 | Japan . |

Primary Examiner—Jose L. Couso
Attorney, Agent, or Firm—Oliff & Berridge, PLC

[57] ABSTRACT

An image information encoding device is provided, wherein an image analyzer calculates image analysis information on divided image information; an image analysis information holder temporarily stores the image analysis information therein; a weighting part performs a predetermined weighting process on each of the image analysis information and peripheral image analysis information temporarily stored in the image analysis information holder and outputs resultant information therefrom as final image analysis information; a coding parameter determination unit determines a coding parameter from the image analysis information and image output characteristic information; and an image information encoding unit encodes the divide image information, based on the coding parameter. Owing to the above construction, image-quality control utilizing the input image analysis information, coded characteristic information and image output device characteristic information can be performed even in a small-scale device configuration.

10 Claims, 12 Drawing Sheets

IMAGE INFORMATION ENCODING DEVICE

BACKGROUND OF THE INVENTION

1. Field of the Invention

This invention relates to an encoding device for performing an encoding process on digital image information.

2. Description of the Related Art (Demand for image encoding)

An image has recently been encoded to reduce the capacity of a storage medium or transmission time. The image encoding will hereinafter be used in the same sense as image compression.

In a system wherein an image input device such as a scanner or the like or an image generating device such as a computer or the like and an image output device such as a printer or the like are connected to one another through a network, an input image is compressed, transmitted and stored. Since the image employed in this type of system is high-defined and colored and becomes large in capacity in recent years, an increase in compression rate of the image grows in importance.

Since an image processing device is now making high progress in its resolution and speed, there is a demand for a high-speed encoding processing technique.

(Reversible encoding and non-reversible encoding)

A reversible system and a non-reversible system are known as image encoding systems. In the reversible system, an image (hereinafter called "decoded image") subjected to encoding and decoding processes completely coincides with the original image. In contrast to this, a decoded image employed in the non-reversible system does not completely coincide with the original image and is hence degraded in quality according to its compression rate.

(Problem on non-reversible encoding)

If the image is placed under the same encoding condition in the non-reversible encoding, then the quality (hereinafter called "decoded image quality") of the decoded image is degraded as the compression rate increases. Namely, there is a trade-off between the compression rate and the decoded image quality. This is because the non-reversible encoding achieves a high compression rate by abandoning information in the image, which is considered to be relatively hard to influence vision. Therefore, if the compression rate is low, then information to be abandoned is reduced and the decoded image quality is good. However, if the compression rate is rendered high, then information to be abandoned increases and the decoded image quality is degraded.

It is desirable that both the compression rate and the decoded image quality are normally high upon execution of image compression. It is therefore necessary to provide a mechanism for predicting and controlling the decoded image quality upon the non-reversible encoding.

(Conventional example 1 of the non-reversible encoding system having an image-quality control mechanism)

As an encoding system having an image-quality control mechanism, for example, an "image data encoding device" (Japanese Published Unexamined Patent Application No. Hei 5-292326) is known. Its configuration is shown in FIG. 17. Incidentally, unnecessary parts are omitted. In the drawing, reference numeral 5000 indicates image information, reference numeral 5001 indicates a DCT (Discrete Cosine Transform) part, reference numeral 5002 indicates a linear quantizer, reference numeral 5003 indicates a variable-length encoder, reference numeral 5004 indicates a quantize condition determinator or decider, reference numeral 5005 indicates an image quality determinator, reference numeral 5006 indicates a DCT coefficient or factor, and reference numeral 5007 indicates a quantize DCT coefficient or factor. The input image information 5000 is subjected to DCT by the DCT part 5001 and thereafter quantized by the linear quantizer 5002. The quantized information is subjected to variable-length encoding by the variable-length encoder 5003. At this time, the image quality determinator 5005 performs an image quality decision using an evaluation function, based on the DCT factor 5006 and the quantize DCT factor 5007 and gives instructions for a change of quantize condition to the quantize condition decider 5004 until the value of the evaluation function satisfies a predetermined condition to thereby perform image quality control.

In addition to this, a system for performing image quality control while encoding the entire image under the common quantize conditions through the use of the mean and worst values of evaluation function values in the entire region lying within an image has been described.

The above description shows the conventional or prior art example 1 of the encoding system having the image-quality control mechanism.

(Problem on conventional example 1 of the encoding system having an image-quality control mechanism)

An image-quality degradation principle or norm (image-quality evaluation function) uniform over the entire region in the image is applied to the conventional example 1. However, subjective image quality actually varies even in the case of the same evaluation function values (quantize errors) depending on characteristics of image areas or regions (such as a flat region, a region in which edge images exist in the flat region, a region very complex and including a lot of noise, etc.). Thus, there is a possibility that the image quality will locally fall short of a target or cause waste in terms of the compression rate.

(Conventional example 2 of the non-reversible encoding system having an image-quality control mechanism—characteristic reflection of image areas)

As a method for solving the problem of the aforementioned conventional example 1, for example, an "image data encoding method" (Japanese Published Unexamined Patent Application Hei 6-006610) is known. Its configuration is shown in FIGS. 18 and 19. In the drawing, reference numeral 5100 indicates image information, reference numeral 5101 indicates a DCT part, reference numeral 5102 indicates a linear quantizer, reference numeral 5103 indicates a variable-length encoder, reference numeral 5104 indicates image-quality decision/quantize condition determination unit, reference numeral 5105 indicates a DCT factor, reference numeral 5106 indicates a quantize DCT factor, 5107 indicates coded information, reference numeral 5108 indicates quantize matrix information, reference numeral 5109 indicates decoded image information, reference numeral 5110 indicates a reverse DCT part, reference numeral 5111 indicates a linear reverse quantizer, reference numeral 5112 indicates a subtracter, reference numeral 5113 indicates a vision characteristic weighting part, reference numeral 5114 indicates an image region or area divider, reference numeral 5115 indicates a degradation factor calculator, reference numeral 5116 indicates an objective evaluation scale calculator, and reference numeral 5117 indicates a quantize matrix selection controller.

The conventional example 2 illustrates a system utilizing DCT and quantization in combination as an encoding system. The conventional example 2 is identical to the conventional example 1 in that means for performing switching between quantize characteristics (quantize matrixes) for image-quality control is used. To determine a quantize matrix, the subtracter 5112 extracts an error between the image information 5100 and the decoded image information 5109. The vision characteristic weighting part 5113 assigns weights to the information outputted from the subtracter 5112. The image area divider 5114 divides the input information into areas or regions and the degradation factor calculator 5115 measures various image-quality degradation factors such as block distortion, mosquito noise, etc. The objective evaluation scale calculator 5116 assigns weights to the image-quality degradation factors corresponding to the characteristics of the divided regions or areas to thereby calculate an objective evaluation scale. The quantize matrix selection controller 5117 determines a quantize matrix which satisfies conditions in terms of the amount of codes and the image quality. The conventional example 2 is capable of controlling the image quality with higher accuracy than that obtained in the conventional example 1 in that the local characteristic of the image is reflected upon calculation of the objective evaluation scale.

The above description shows the conventional example 2 of the encoding system having an image-quality control mechanism.

(Problems on conventional examples 1 and 2 of the encoding systems having image-quality control mechanisms)

The conventional examples 1 and 2 do not take into consideration the image output device for outputting the decoded image. However, they are actually different from each other in how to detect image-quality or picture degradation due to encoding depending on the characteristics of the image output device.

Quantization in a space region for reducing the number of bits per pixel, for example, will cause picture degradation due to a gradation level difference called pseudo outline or contour. However, this is deeply concerned with tonal or gradation reproducibility of the output device. Namely, when the output device is poor in tonal reproducibility, the pseudo outline is not judged to be picture degradation due to encoding.

(Proposal of the non-reversible encoding system having an image-quality control mechanism—characteristic reflection of output device)

The present applicant has already proposed a "device for and method of predicting image quality and a device for and method of controlling image quality" (Japanese Patent Application No. Hei 8-229138, unopen to the public) as an approach for solving the problems on the aforementioned conventional examples 1 and 2. Their configurations are shown in FIGS. 20 and 21. In the drawing, reference numeral 5200 indicates image information, reference numeral 5201 indicates a blocking part, reference numeral 5202 indicates a DCT part, reference numeral 5203 indicates a quantizer, reference numeral 5204 indicates an encoding unit, reference numeral 5205 indicates an image information analyzing unit, reference numeral 5206 indicates an image output device characteristic input unit, reference numeral 5207 indicates a quantize selection unit, reference numeral 5208 indicates image analysis information, reference numeral 5209 indicates image output device characteristic information, reference numeral 5210 indicates quantize matrix information, reference numeral 5211 indicates a quantize matrix input part, reference numeral 5212 indicates an image-quality degradation item coding characteristic influence-degree determinator, reference numeral 5213 indicates an image-quality degradation item image characteristic influence-degree determinator, reference numeral 5214 indicates an image-quality degradation item output device characteristic influence-degree determinator, reference numeral 5215 indicates an image-quality degradation item determinator, and reference numeral 5216 indicates a quantize matrix determinator or decider.

Even in the case of the present proposed approach, a system utilizing DCT and quantization in combination is illustrated as an encoding system. The present system is identical to the conventional examples 1 and 2 in that means for performing switching between quantize matrixes is used for image quality control. In order to determine a quantize matrix, the image-quality degradation item coding characteristic influence-degree determinator 5212 of the quantize selection unit 5207 measures the degree of an influence exerted on each image-quality degradation item of the present-selected quantize matrix. The image-quality degradation item image characteristic influence-degree determinator 5213 thereof measures the degree of an influence exerted on each image-quality degradation item of input image information. The image-quality degradation item output device characteristic influence-degree determinator 5214 thereof measures the degree of an influence exerted on each image-quality degradation item of output device characteristic information. Further, the image-quality degradation item determinator 5215 predicts the rate of generation of each image-quality degradation item, based on the above three types of influence degrees. The quantize matrix decider 5216 determines a quantize matrix for achieving target image quality, based on the result of prediction.

The aforementioned proposed approach divides the decoded image quality into a plurality of image-quality degradation items and measures/evaluates the image quality according to the image-quality degradation items The image-quality degradation items may include, for example, a pseudo outline or contour generated due to quantization in a space region to reduce tonal or gradation levels, a blur generated due to the removal of high-frequency components, mosquito noise generated due to quantization in a frequency domain, etc. An advantage is brought about in that the division of the decoded image quality according to the image-quality degradation items in the above-described manner makes it easy to extract one which is high in correlation with image quality corresponding to subjective evaluation from the three characteristics of the input image characteristic, output device characteristic and coding characteristic which have deep connection with the decoded image quality. As a result, high-accuracy image quality control using the above-described characteristic information can be achieved.

(Problems on conventional examples 1 and 2 of the encoding systems having image-quality control mechanisms and the previous proposal)

In the approaches for performing the image-quality control utilizing the analysis information on the divided images as in the prior art 2 and the previous proposal, the accuracy of analysis of the image characteristics exerts a great influence on the accuracy of the image-quality control. This is because the coding characteristic and output device characteristic are often fixed within the system to some extent, whereas the image characteristic is hard to be analyzed with satisfactory accuracy since it is locally changed even within one image.

An the image analysis executed for image-quality control must have high correlation with the result of subjective evaluation. It is desirable in that sense that an analysis size (corresponding to the number of pixels of each divided image) is the extent (corresponding to, e.g., 128 pixels×128 lines or the like in the case of an output produced in a resolution of 16 pixels/mm) to which image-quality or picture degradation is detected through the human eyes. However, the image size for sensory evaluation ranges from several tens to hundreds times if one considers that a pixel block size employed in the ordinary or general encoding system is 8 pixels×8 lines, thus causing a big problem in terms of pixel implementation.

In the conventional examples, etc., no special mention is not made about component encoding for encoding a color image comprised of a plurality of color components in color component units. A color image processing system for processing a high-resolution image at high speed needs to parallelize processes for respective color components and achieve their speeding-up. In this case, the component encoding is indispensable. When color image information is a natural image such as a photograph and a color space is RGB or YMC, it is generally known that the correlation of image characteristics between respective color components is high. Since the image characteristic used as the image analysis information in the previous proposal is used to represent image contents (patterns) in a region in which gradation varies smoothly, an edge-existing region, etc. while notice is taken of the rate of generation of image-quality degradation items, it can be expected that analysis results, which resemble between the color components in particular, are obtained.

On the other hand, there may be cases in which the degree of an influence on the decoded image quality for each color component is not uniform. This means that there may be cases in which the image quality degradation due to encoding is hard to be detected depending on the color components on an output image represented in colors. Even if such color components are encoded with a compression rate higher than that for other color components, they can be expected to exert no influence on the image quality of the color image.

SUMMARY OF THE INVENTION

With the foregoing in view, it is therefore an object of the present invention to provide an encoding technique wherein in an encoding device for performing image-quality control using input image analysis information, coding characteristic information, and image output device characteristic information, analysis information in a peripheral area are used upon image analysis to thereby implement or realize high-accuracy image-quality control in a small-scale device configuration. It is another object of the present invention to shorten analysis time utilizing high correlation between color components of input image analysis information, perform processing at high speed and improve a compression rate utilizing the degree of an influence on image quality for each color component when color image information composed of a plurality of color components are encoded for respective color components.

According to a first aspect of this invention, for achieving the above objects, there is provided an image information encoding device comprising:

image information dividing means for dividing image information into a plurality of pieces of divided image information;

image analysis information input means for inputting image analysis information related to the rate of generation of at least one image-quality degradation item of the divided image information;

image output device characteristic input means for inputting image output device characteristic information related to the rate of generation of at least one image-quality degradation item;

coded parameter determining means for determining each of coding parameters, based on the image analysis information inputted from the image analysis information input means and the image output device characteristic information inputted from the image output device characteristic input means so that decoded divided image information corresponding to a result obtained by coding and decoding the divided image information reaches target image quality; and image information encoding means for encoding the divided image information by using the coding parameter outputted from the coding parameter determining means. The image analysis information input means has image analyzing means, image analysis information holding means, and image analysis information weighting means. The image analyzing means calculates image analysis information and inputs the same to the image analysis information holding means and the image analysis information weighting means. The image analysis information holding means stores the image analysis information inputted from the image analyzing means in a predetermined place. The image analysis information holding means reads peripheral image analysis information corresponding to image analysis information on divided image information located around the corresponding divided image information being analyzed by the image analyzing means from a predetermined place and inputs the read information to the image analysis information weighting means. The image analysis information weighting means performs a predetermined weighting process on the image analysis information inputted from the image analyzing means and the peripheral image analysis information inputted from the image analysis information holding means and inputs the result of processing to the coding parameter determining means as image analysis information.

In the above-described construction, the analysis can be stabilized by utilizing the result of an analysis of the periphery of each divided image.

According to a second aspect of this invention, for achieving the above objects, there is provided an image information encoding device comprising:

image information dividing means for dividing image information into a plurality of pieces of divided image information;

image analysis information input means for inputting image analysis information related to the rate of generation of at least one image-quality degradation item of the divided image information;

image output device characteristic input means for inputting image output device characteristic information related to the rate of generation of at least one image-quality degradation item;

coded parameter determining means for determining a coding parameter, based on the image analysis information inputted from the image analysis information input means and the image output device characteristic information inputted from the image output device characteristic input means so that decoded divided image information corresponding to a result obtained by coding and decoding the divided image information reaches target image quality; and image information encoding means for encoding the divided image information by using the coding parameter outputted from the coding parameter determining means. The image analysis information input means has image analyzing means, area analysis information calculating means, area analysis information holding means, and area analysis weighting means. The image analyzing means calculates image analysis information. The area analysis information calculating means calculates area analysis information on area image information composed of a plurality of pieces of the divided image information, based on a plurality of pieces of image analysis information inputted from the image analyzing means and inputs the calculated area analysis information to the area analysis information holding means and the area analysis information weighting means. The area analysis information holding means stores each of the area analysis information inputted from the area analysis information calculating means into a predetermined place. The area analysis information holding means reads peripheral area analysis information corresponding to area analysis information on area image information located around the corresponding area image information being analyzed by the area analysis information calculating means from a predetermined place and inputs the read information to the area analysis information weighting means. The area analysis information weighting means performs a predetermined weighting process on the area analysis information inputted from the area analysis information calculating means and the peripheral area analysis information inputted from the area analysis information holding means and inputs the result of processing to the coding parameter determining means as area analysis information.

In the above-described construction, the capacity of each memory, which is necessary for the analysis, can be reduced and hence implementation becomes easy even when the size of each analyzed image is increased to improve analysis accuracy.

In the above-described construction, the image analysis information input means has image analyzing means and image analysis information holding means. The image analysis information input means may analyze image information about specific color components through the use of the image analyzing means when the image information is composed of a plurality of color components, input the resultant image analysis information to the coding parameter determining means, and allow the image analysis information holding means to store the image analysis information. The image analysis information input means may read the image analysis information about the specific color components, identical in position relation therebetween from the image analysis information holding means in the case of image information on other color components and input the read image analysis information to the coding parameter determining means. Thus, the time required to analyze an input image can be reduced and an encoding process including image-quality control can be implemented at a high speed.

In the above-described construction, the image analysis information input means has image analyzing means, image analysis information holding means and image analysis information weighting means. The image analysis information input means may analyze image information about specific color components through the use of the image analyzing means when the image information is composed of a plurality of color components, input the resultant image analysis information to the coding parameter determining means, and allow the image analysis information holding means to store the image analysis information. The image analysis information input means may read the image analysis information about the specific color components, identical in position relation therebetween from the image analysis information holding means in the case of image information on other color components and input the so-processed information to the coding parameter determining means. When the image information is composed of a plurality of color components, the image analysis information input means may perform weighting related to the rate of generation of an image-quality degradation item for each color component to thereby determine a coding parameter. Thus, the time necessary for the analysis can be reduced and the efficiency of compression can be improved.

In the above-described construction, the coding parameter determining means has a plurality of image-quality degradation item-by-item coding parameter calculating means related to generation rates of image-quality degradation items. Further, the coding parameter determining means includes coding parameter selecting means for selecting one of a plurality of coding parameters outputted from the image-quality degradation item-by-item coding parameter calculating means. The coding parameter determining means may read a coding parameter from the image-quality degradation item-by-item coding parameter holding means based on the image analysis information inputted from the image analysis information input means and the image output device characteristic information inputted from the image output device characteristic input means and select the most undegraded one from the plurality of coding parameters by using the coding parameter selecting means. Thus, when the coding parameters different for respective image-quality degradation items are selected, the intended image quality can be achieved for all the items.

In the above-described construction, the coding parameter determining means has weighting factor determining means and coding parameter calculating means. The weighting factor determining means determines weighting information for calculating a coding parameter, based on the output device characteristic information related to the rate of generation of at least one image-quality degradation item. The coding parameter calculating means may perform a weighting process on the image analysis information related to the rate of generation of at least one image-quality degradation item, based on a weighting factor outputted from the weighting factor determining means to thereby calculate a coding parameter. Thus, the influence on the image quality for each image-quality degradation item can be suitably weighted according to the characteristic of the output device.

In the above-described construction, the image information encoding device further includes coding characteristic input means for inputting coding characteristic information of the image encoding device, related to the rate of generation of at least one image-quality degradation item. The coding parameter determining means may determine the coding parameter, based on the image analysis information inputted from the image analysis information input means, the image output device characteristic information inputted from the image information output device characteristic input means and the coding characteristic information inputted from the coding characteristic input means so that decoded divided image information corresponding to a result obtained by coding and decoding the divided image information reaches target image quality. Thus, even when the encoding device performs switching between the coding characteristics, suitable image-quality control can be performed.

In the above-described construction, the coding parameter determining means has a plurality of image-quality degradation item-by-item coding parameter holding means related to generation rates of image-quality degradation items. Further, the coding parameter determining means includes coding parameter selecting means for selecting one of a plurality of coding parameters read from the image-quality degradation item-by-item coding parameter holding means. The coding parameter determining means may read coding parameters from the image-quality degradation item-by-item coding parameter holding means based on the image analysis information inputted from the image analysis information input means, the image output device characteristic information inputted from the image output device characteristic input means, and the coding characteristic information inputted from the coding characteristic input means and select the most undegraded one from the plurality of coding parameters by using the coding parameter selecting means.

In the above-described construction, the coding parameter determining means has weighting factor determining means and coding parameter calculating means. The weighting factor determining means determines weighting information for calculating a coding parameter, based on the output device characteristic information related to the rate of generation of at least one image-quality degradation item and the coding characteristic information related to the rate of generation of at least one image-quality degradation item. The coding parameter calculating means may perform a weighting process on the image analysis information related to the rate of generation of at least one image-quality degradation item, based on a weighting factor outputted from the weighting factor determining means to thereby calculate a coding parameter.

In the above-described construction, the image output device characteristic input means has image output device characteristic holding means related to the rate of generation of at least one image-quality degradation item. The image output device characteristic input means may read the image output device characteristic from the image output device characteristic holding means based on image output device characteristic information inputted from the outside. Thus, when the types of the image output device are limited, the time and effort for inputting the image output device characteristic can be simplified if characteristic information about an image output device to be used is prepared in advance.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

[First Embodiment]

Figure 1:
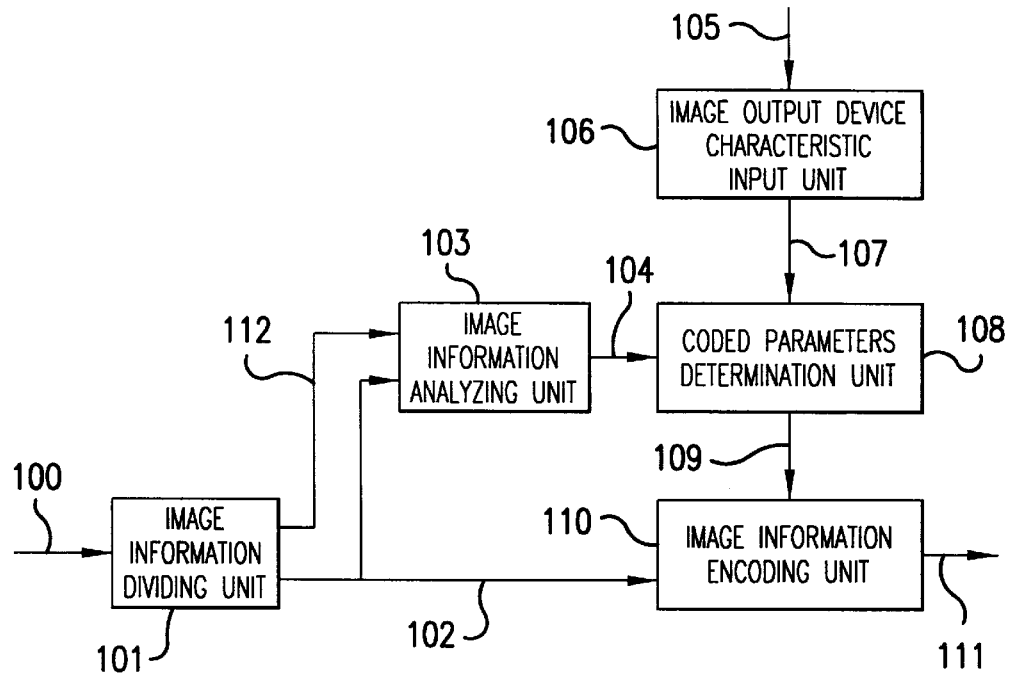
FIG. 1 is a block diagram schematically showing an image information encoding device according to a first embodiment of the present invention.

FIG. 1 is a block diagram showing a first embodiment of an image information encoding device according to the present invention. In the drawing, reference numerals 100, 101, 102, 103, 104, 105, 106, 107, 108, 109, 110, 111 and 112 indicate image information, an image information dividing unit, divided image information, an image information analyzing unit, image analyzed or analysis information, image output device information, an image output device characteristic input unit, image output device characteristic information, a coding parameter determination unit, an input coding parameter, an image information encoding unit, code information, and image position information respectively.

The operation of the image information encoding device will next be described. The image information dividing unit 101 divides the image information 100 into divided images 102 composed of m pixels×n lines. The image information analyzing unit 103 analyzes them and inputs the image analyzed or analysis information 104 to the coding parameter determination unit 108. The coding parameter determination unit 108 determines the input coding parameter 109 for obtaining target image quality, based on both the image output device characteristic information 107 inputted from the image output device characteristic input unit 106 based on the image output device information 105 inputted from the outside, and the image analysis information 104, and inputs it to the image information encoding unit 110. The image information encoding unit 110 codes or encodes the divided image information 102 by using the input coding parameter 109 and outputs the code information 111 therefrom.

An example of the configuration of the image information analyzing unit 103, an example of the configuration of the image output device characteristic input unit 106, an example of the configuration of the coding parameter determination unit 108 and an example of the configuration of the image information encoding unit 110 are shown in FIGS. 2, 5, 6, and 7 respectively.

Figure 7:
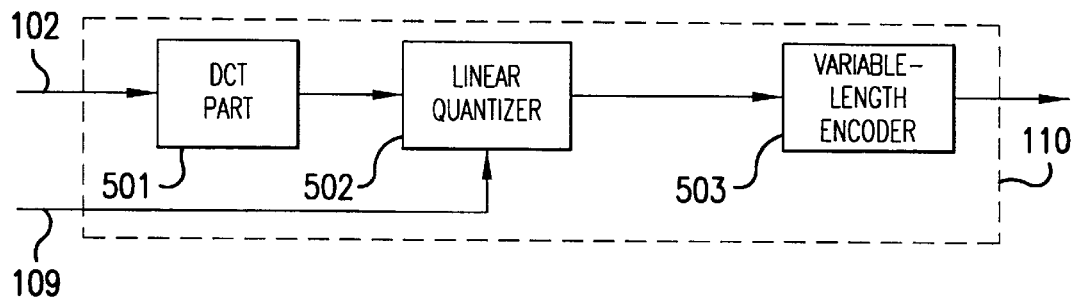
FIG. 7 is a block diagram schematically depicting an image information encoding unit employed in the first embodiment of the present invention.

The image information encoding unit 110 shown in FIG. 7 will first be described for convenience's sake. FIG. 7 shows the configuration of a general image encoder employed even in a JPEG (Joint Photographic coding Experts Group) system in a manner similar to the conventional or prior art example. In the same drawing, reference numeral 501 indicates a DCT part, reference numeral 502 indicates a linear quantizer for quantizing a DCT factor or coefficient, and reference numeral 503 indicates a variable-length encoder for variable-length coding the quantized DCT coefficient. The DCT part 501 converts the divided image information into pixel block units comprised of 8 pixels×8 lines. The linear quantizer 502 quantizes 64 conversion coefficients or factors by using a quantize or quantization matrix composed of 64 elements. Numerical values of the quantization matrix represent quantize intervals (quantize step sizes) of each of the 64 factors. The input coding parameter 109 inputted to the linear quantizer 502 is equal to a numerical value called "scaling factor (SF)" under the JPEG system. The respective numerical values of the quantize matrix are multiplied by SF so as to control the roughness of quantization.

Figure 2:
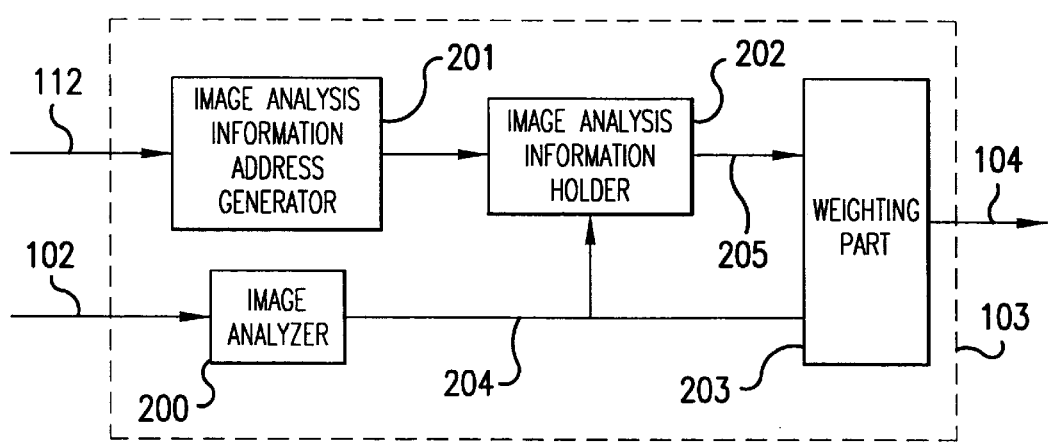
FIG. 2 is a block diagram schematically illustrating an image information analyzing unit employed in the first embodiment of the present invention.

The image information analyzing unit 103 shown in FIG. 2 will next be explained. Referring to FIG. 2, reference numeral 200 indicates an image analyzer, reference numeral 201 indicates an image analysis information address generator, reference numeral 202 indicates an image analysis information holder, reference numeral 203 indicates a weighting part, reference numeral 204 indicates image analysis information, and reference numeral 205 indicates peripheral image analysis information. The image analyzer 200 calculates the image analysis information 204 on the divided image information 102 and inputs the result of calculation to the image analysis information holder 202 and the weighting part 203. The image analysis information holder 202 stores therein the image analysis information 204 inputted from the image analyzer 200 in accordance with an address generated by the image analysis information address generator 201 based on the image position information 112. Further, the image analysis information holder 202 reads the peripheral image analysis information 205 corresponding to image analysis information on divided image information, which is located on the periphery of the divided image information 102 being analyzed at present in accordance with the address generated by the image analysis information address generator 201 based on the image position information 112, from a predetermined place and inputs the read peripheral image analysis information 205 to the weighting part 203. The weighting part 203 performs a predetermined weighting process on the image analysis information 204 and the peripheral image analysis information 205 and outputs the result of processing therefrom as the image analysis information 104.

Figure 3:
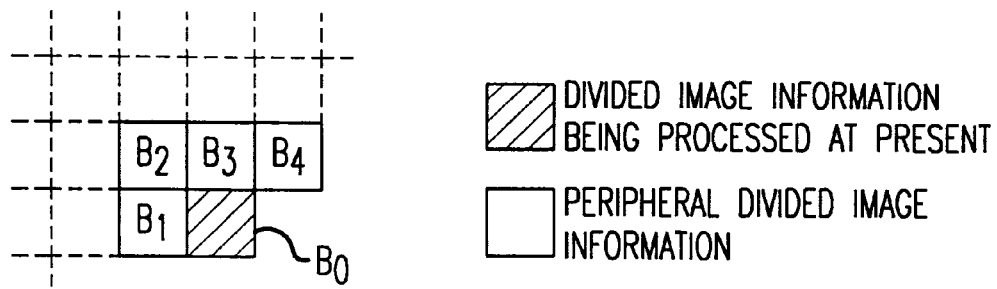
FIG. 3 is a diagram for describing an example of selection of peripheral image information employed in the first embodiment of the present invention.

FIG. 3 shows an example in which pieces of peripheral image information used for the analysis of the image information analyzing unit 103 are selected. In the drawing, $B_i$ indicate divided image information. $B_0$ indicates divided image information subjected to processing at present. $B_1$ to $B_4$ indicate peripheral divided image information respectively. Assuming that image analysis information 204a about an image-quality degradation item a outputted from the image analyzer 200 is defined as FAA ($B_i$), the weighting part 203 outputs the following equation as image analysis information 104a about the image-quality degradation item a.

$$(pa_0*Fa(B_0)+pa_1*Fa(B_1)+pa_2*Fa(B_2)+pa_3*Fa(B_3)+pa_4*Fa(B_4))/5 \tag{1}$$

where pi represent coefficients used for assigning weights to the image-quality degradation item a by the weighting part 203.

Figure 4:
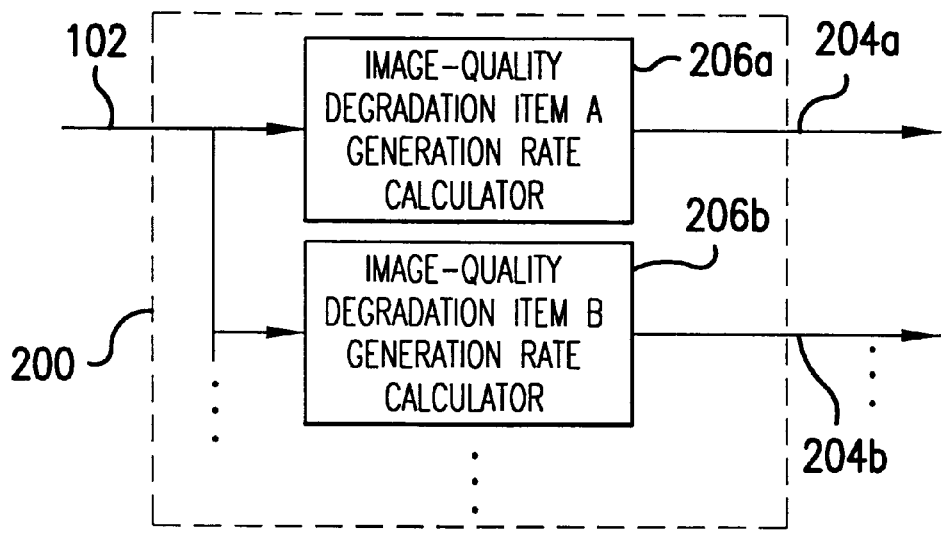
FIG. 4 is a block diagram schematically depicting an image analyzer employed in the first embodiment of the present invention.

FIG. 4 shows one example of the configuration of the image analyzer 200. In FIG. 4, reference numerals 206 indicate image-quality degradation item generation rate calculators, which respectively output predicted values of generation rates as the image analysis information 204 according to image-quality degradation items, based on the input divided image information 102.

Figure 5:
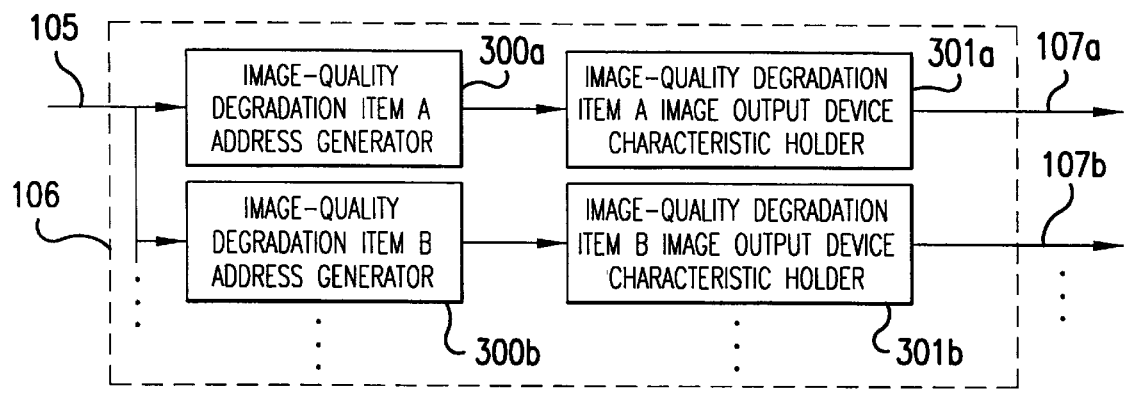
FIG. 5 is a block diagram schematically showing an image output device characteristic input unit employed in the first embodiment of the present invention.
Figure 6:
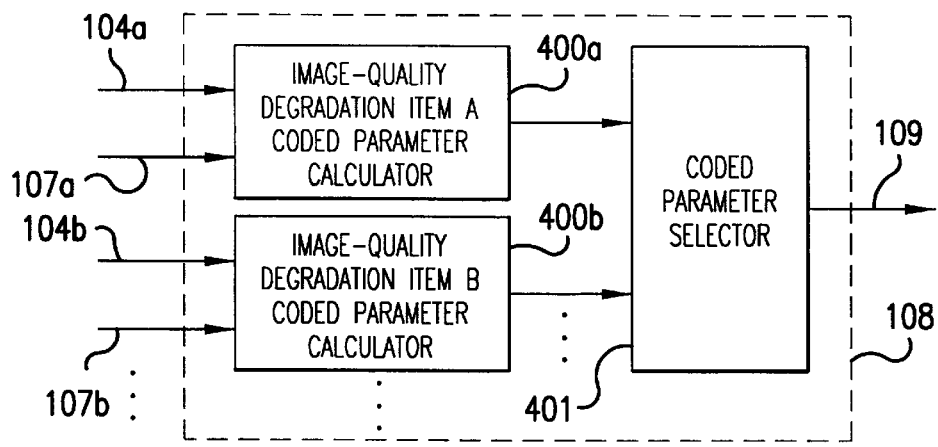
FIG. 6 is a block diagram schematically illustrating a coding parameter determination unit employed in the first embodiment of the present invention.

In the present embodiment, a description will be made of the example of the configuration of the image information encoding unit 110 at the time that the image-quality degradation items are two of a pseudo contour or outline and mosquito noise (in the subsequent description, image-quality degradation items a and image-quality degradation items b shown in FIGS. 2, 5 and 6 will represent pseudo outlines and mosquito noise respectively). An image-quality degradation item a generation rate calculator 200a outputs a predicted value of a generation rate of a pseudo outline from a frequency distribution of the dispersion and pixel values of the divided image 102 as analysis information 104a. An image-quality degradation item b generation rate calculator 200b performs edge detection based on pattern matching on the divided image 102 and outputs, as analysis information 104b, a value obtained by predicting a generation rate of mosquito noise through the use of the dispersion of the divided image 102 calculated by the image-quality degradation item a generation rate calculator 200a.

The image output device characteristic input unit 106 will next be explained. In FIG. 5, reference numeral 300 indicates an image-quality degradation item address generator. Reference numeral 301 indicates an image-quality degradation item image output device characteristic holder. The image-quality degradation item a address generator 300a receives an output device number as image output device information 105 therein to generate an address for reading an effective tonal or gradation level of an output device from the image-quality degradation item a image output device characteristic holder 301a and outputs it as image output device characteristic information 107a for each image-quality degradation item a. The image-quality degradation item b address generator 300b generates an address for reading an effective gradation level and frequency response of an output device from an image-quality degradation item b image output device characteristic holder 301b and outputs it as image output device characteristic information 107b for each image-quality degradation item b.

The coding parameter determination unit 108 shown in FIG. 6 will be described. In FIG. 6, reference numeral 400 indicates an image-quality degradation item coding parameter calculator and reference numeral 401 indicates a coding parameter selector. The image-quality degradation item a coding parameter calculator 400a calculates a coding parameter for setting decoded image-quality about each image-quality degradation item a as intended, based on the analysis information 104a and the image output device characteristic information 107a about each image-quality degradation item a. Similarly, the image-quality degradation item b coding parameter calculator 400b calculates a coding parameter for setting decoded image-quality about each image-quality degradation item b as intended, based on the analysis information 104b and the image output device characteristic information 107b about each image-quality degradation item b. The coding parameter selector 401 selects one capable of reducing picture degradation among the coding parameters inputted from the coding parameter calculators 400a and 400b and outputs it as an input coding parameter 109.

[Second Embodiment]

Figure 8:
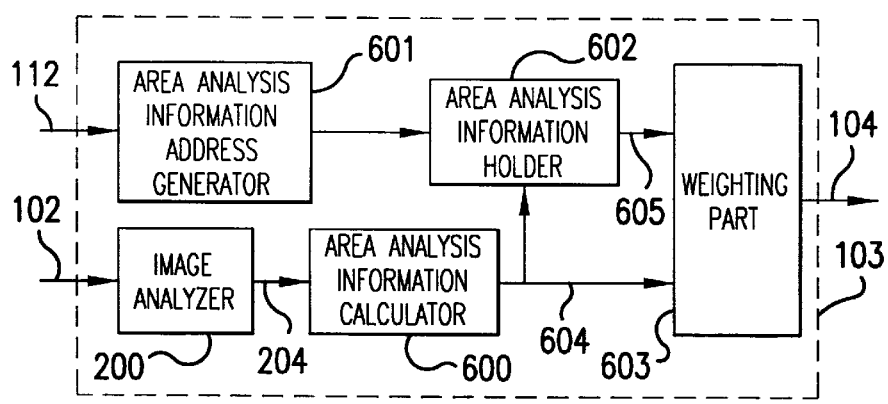
FIG. 8 is a block diagram schematically showing an image information analyzing unit employed in a second embodiment of the present invention.

A second embodiment of the present invention will next be described. FIG. 8 shows the configuration of an image information analyzing unit 103 employed in the second embodiment of the present invention. An image information encoding device according to the present embodiment is identical, in terms of other configurations, to that according to the first embodiment. In FIG. 8, reference numeral 600 indicates an area analysis information calculator, reference numeral 601 indicates an area analysis information address generator, reference numeral 602 indicates an area analysis information holder, reference numeral 603 indicates an area analysis information weighting part, reference numeral 604 indicates area analysis information, and reference numeral 605 indicates peripheral area analysis information, respectively.

Figure 9:
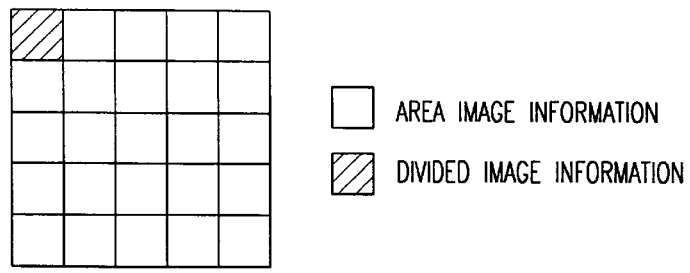
FIG. 9 is diagram illustrating an example of area information employed in the second embodiment of the present invention.

As shown in FIG. 9 by way of illustrative example, a plurality of pieces of divided image information will be collectively called "area image information". The size of each divided image information coincides with a unit to perform encoding by an image information encoding unit 110. Further, the size of each area image information is caused to coincide with a unit to calculate an image characteristic for the purpose of image-quality control.

The area analysis information calculator 600 calculates the area analysis information 604, based on a plurality of pieces of image analysis information 204 inputted from an image analyzer 200 and inputs the same to the area analysis information holder 602 and the area analysis information weighting part 603. The area analysis information holder 602 stores therein the area analysis information 604 inputted from the area analysis information calculator 600 in accordance with an address generated from the area analysis information address generator 601 based on image position information 112. Further, the area analysis information holder 602 reads the peripheral area analysis information 605 corresponding to analysis information on area image information, which is located around area image information being analyzed at present in accordance with the address generated from the area analysis information address generator 601 based on the image position information 112 and inputs the same to the area analysis information weighting part 603. The area analysis information weighting part 603 performs a predetermined weighting process on the area analysis information 604 and the peripheral area analysis information 605 and outputs the result of processing therefrom as image analysis information 104.

[Third Embodiment]

Figure 10:
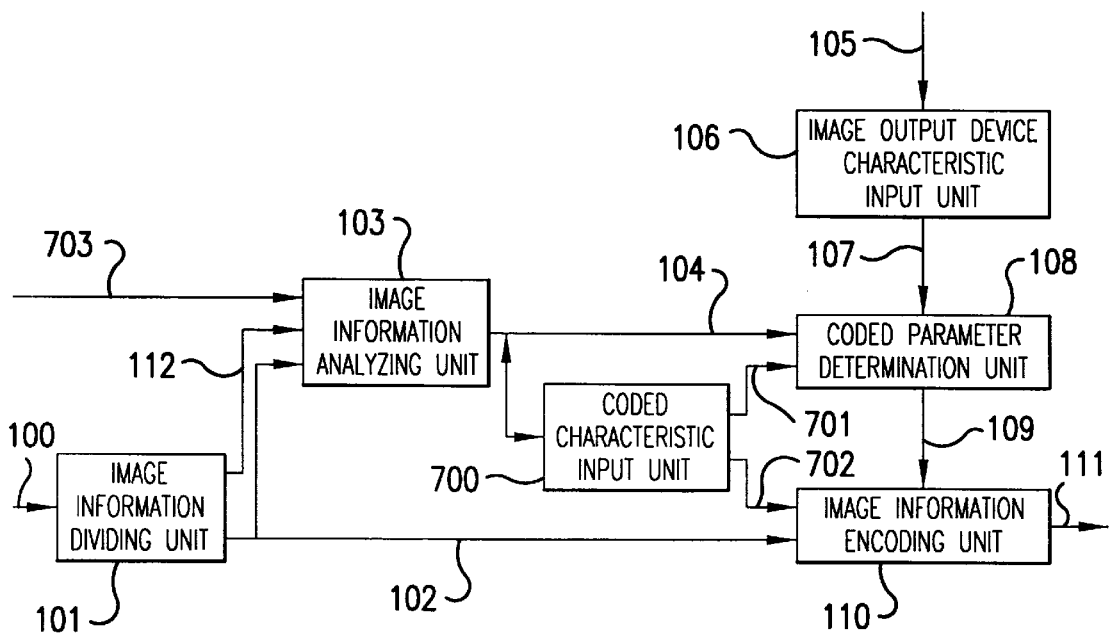
FIG. 10 is a block diagram schematically depicting an image information encoding device according to a third embodiment of the present invention.

FIG. 10 is a block diagram showing a third embodiment of an image information encoding device according to the present invention. The present embodiment is different from the first embodiment in that a coding characteristic input unit 700 is additionally provided and in that a signal to be input to an image information analyzing unit 103 is added. In the present embodiment, an image information encoding unit 110 performs encoding different in coding characteristic, based on coding characteristic information 702 inputted from the coding characteristic input unit 700. Therefore, a coding parameter determination unit 108 determines a coding parameter, even based on coding characteristic information 701 as well as on the image analysis information 104 and the image output device characteristic information 107 described in the first embodiment. In the present embodiment as well, color image information composed of a plurality of color components are encoded in color component units. The image information analyzing unit 103 performs operations corresponding to the color components, based on input color component information 703.

The image information encoding unit 110 employed in the present embodiment takes the same configuration shown in FIG. 7 as that of the image information encoding unit employed in the first embodiment. Similarly, the image information analyzing unit 103 and image output device input unit 106 take the configurations shown in FIGS. 2 and 5 respectively.

Figure 11:
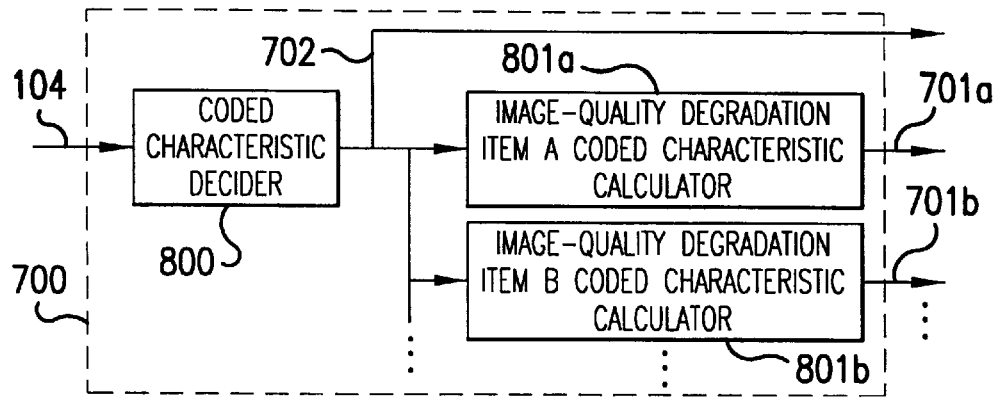
FIG. 11 is a block diagram schematically showing a coding characteristic input unit employed in the third embodiment of the present invention.
Figure 12:
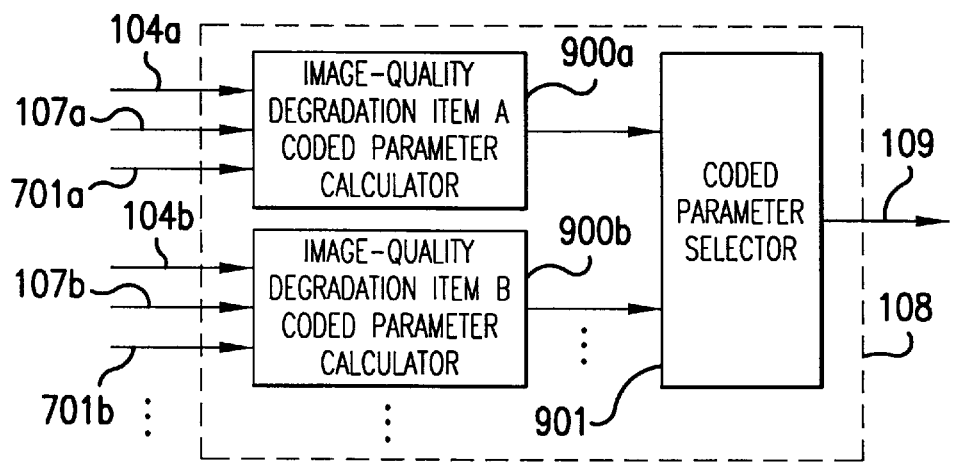
FIG. 12 is a block diagram schematically illustrating a coding parameter determination unit employed in the third embodiment of the present invention.
Figure 13:
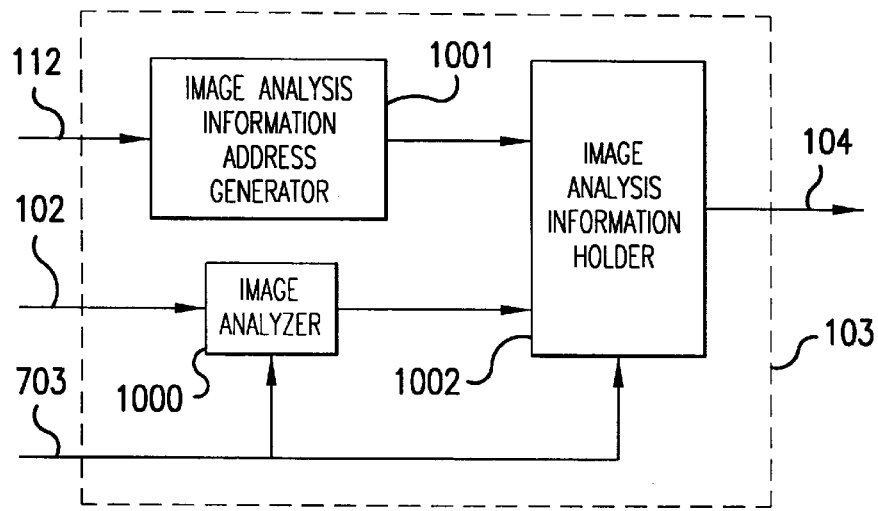
FIG. 13 is a block diagram schematically depicting an image information analyzing unit employed in the third embodiment of the present invention.

The configuration of the coding characteristic input unit 700, the configuration of the coding parameter determination unit 108 and the configuration of the image information analyzing unit 103 are respectively shown in FIGS. 11, 12, and 13.

The coded characteristic input unit 700 shown in FIG. 11 will be described. In FIG. 11, reference numeral 800 indicates a coded characteristic determinator or decider and reference numeral 801 indicates an image-quality degradation item coded characteristic calculator. The coded characteristic decider 800 sets a quantize matrix employed in a linear quantizer 502 based on the image analysis information 104. Namely, when an analysis result that the generation rate of a pseudo outline corresponding to a divided image is high, is obtained from the image information analyzing unit 103, such a quantize matrix as to make the quantization of a low-frequency component fine and make the quantization of a high-frequency component rough is adopted. When an analysis result that the generation rate of mosquito noise is high, is obtained from the image information analyzing unit 103, such a quantize matrix as to make the quantization of the high-frequency component fine is adopted. The image-quality degradation item a coded characteristic calculator

801*a* calculates and outputs coded characteristic information 701*a* indicative of the rate of generation of a pseudo outline by the image information encoding unit 110, based on the quantize matrix selected by the coded characteristic decider 800. Similarly, the image-quality degradation item b coded characteristic calculator 801*b* calculates and outputs coded characteristic information 701*b* indicative of the rate of generation of mosquito noise by the image information encoding unit 110, based on the quantize matrix selected by the coded characteristic decider 800.

The coding parameter determination unit 108 shown in FIG. 12 will next be described. In FIG. 12, reference numeral 900 indicates an image-quality degradation item coding parameter calculator and reference numeral 901 indicates a coding parameter selector. The image-quality degradation item a coding parameter calculator 900*a* calculates a coding parameter for setting decoded image-quality about each image-quality degradation item a as intended, based on analysis information 104*a* and image output device characteristic information 107*a* about each image-quality degradation item a and coded characteristic information 701*a*. Similarly, the image-quality degradation item b coding parameter calculator 900*b* calculates a coding parameter for setting decoded image-quality about each image-quality degradation item b as intended, based on analysis information 104*b* and image output device characteristic information 107*b* about each image-quality degradation item b and coded characteristic information 701*b*. The coding parameter selector 901 selects one capable of reducing picture degradation among the coding parameters inputted from the coding parameter calculators 900*a* and 900*b* and outputs it as an input coding parameter 109.

The image information analyzing unit 103 shown in FIG. 13 will next be explained. In FIG. 13, reference numeral 1000 indicates an image analyzer, reference numeral 1001 indicates an image analysis information address generator, and reference numeral 1002 indicates an image analysis information holder.

If the color component information 703 indicates a first color component, then the image analyzer 1000 performs its analysis. The image analysis information holder 1002 stores therein first color component analysis information outputted from the image analyzer 1000 in accordance with an address generated by the image analysis information address generator 1001 based on the image position information 112 and outputs it as analysis information 104. If the color component information 703 does not indicate the first color component, then the image analyzer 1000 does not perform its analysis. The image analysis information holder 1002 outputs, as the analysis information 104, the first color component analysis information stored in accordance with the address generated by the image analysis information address generator 1001 based on the image position information 112. The analysis of the image analyzer 1000 at this time is similar to that of the image information analyzing unit 103 employed in the second embodiment.

[Fourth Embodiment]

Figure 14:
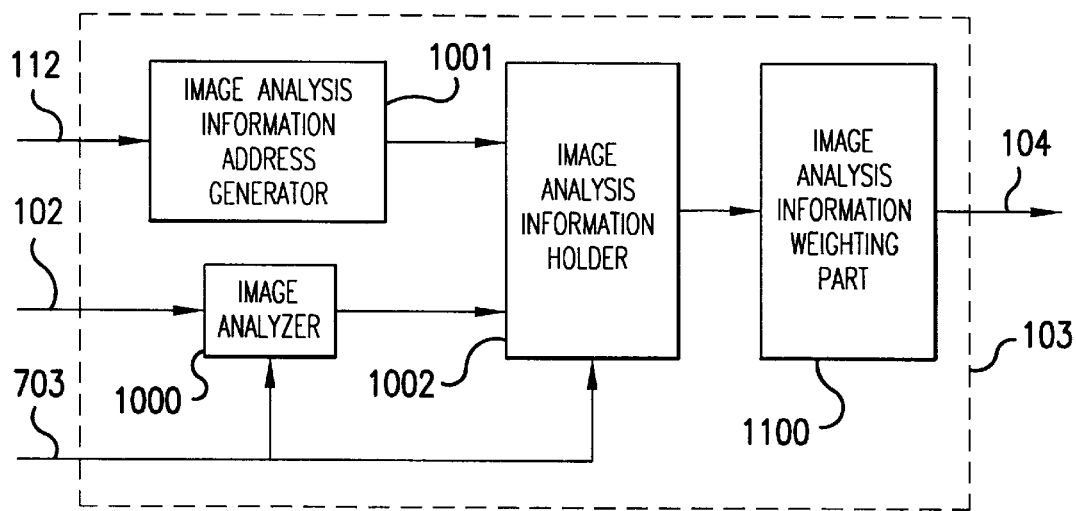
FIG. 14 is a block diagram schematically showing an image information analyzing unit employed in a fourth embodiment of the present invention.

FIG. 14 shows a configuration of an image information analyzing unit 103 employed in a fourth embodiment of the present invention. The fourth embodiment is identical, in terms of overall configuration, to that shown in FIG. 10. Even in the present embodiment, color image information composed of a plurality of color components is coded into color component units in a manner similar to the third embodiment.

The present embodiment is different from the third embodiment in that an image analysis information weighting part 1100 is additionally provided in the configuration of the image information analyzing unit 103 shown in FIG. 10. In the present embodiment, the image analysis information weighting part 1100 performs a predetermined weighting process on analysis information read from an image analysis information holder 1002, based on color component information 703 and outputs the so-processed information therefrom as analysis information 104.

[Fifth Embodiment]

Figure 15:
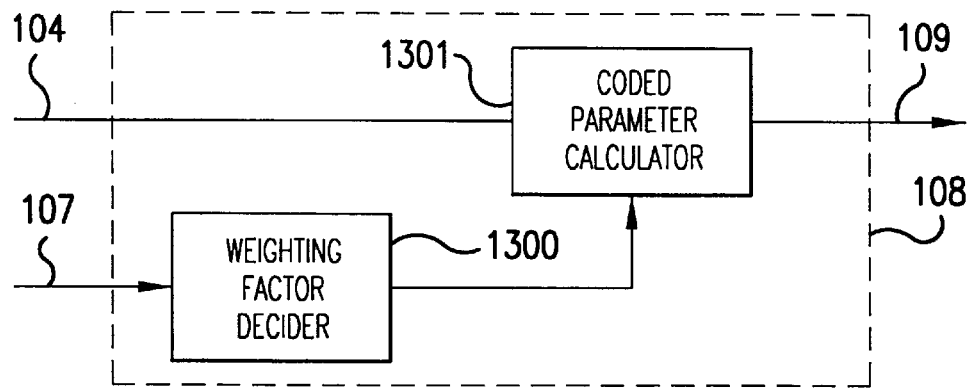
FIG. 15 is a block diagram schematically illustrating a coding parameter determination unit employed in a fifth embodiment of the present invention.

FIG. 15 shows a configuration of a coding parameter determination unit 108 employed in a fifth embodiment of the present invention. The present embodiment is identical, in terms of overall configuration, to that shown in FIG. 10. The present embodiment is different from the third embodiment only in the configuration of the coding parameter determination unit 108.

The coding parameter determination unit 108 shown in FIG. 15 will be explained. In FIG. 15, reference numeral 1200 indicates a weighting factor determinator or decider and reference numeral 1201 indicates a coding parameter calculator. The weighting factor decider 1200 determines weighting information for calculating a coding parameter based on output device characteristic information 107. The coding parameter calculator 1201 performs a weighting process on image analysis information 104, based on the weighting factor information outputted from the weighting factor decider 1200, and outputs a coding parameter 109 therefrom.

[Sixth Embodiment]

Figure 16:
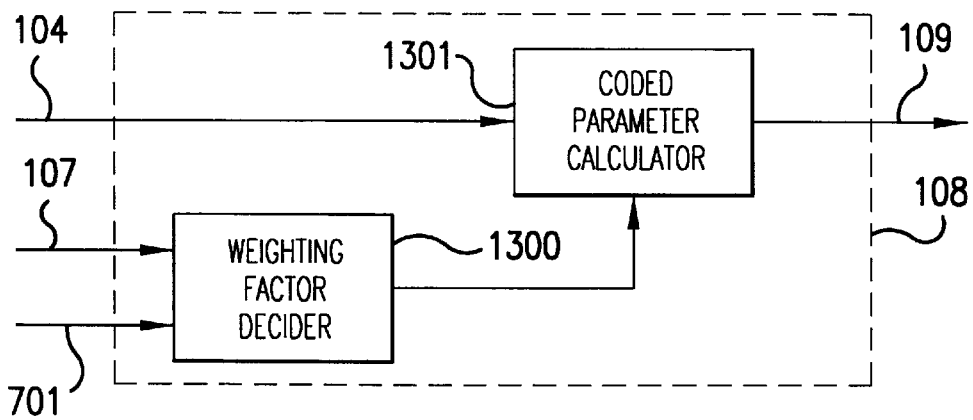
FIG. 16 is a block diagram schematically showing a coding parameter determination unit employed in a sixth embodiment of the present invention.
Figure 17:
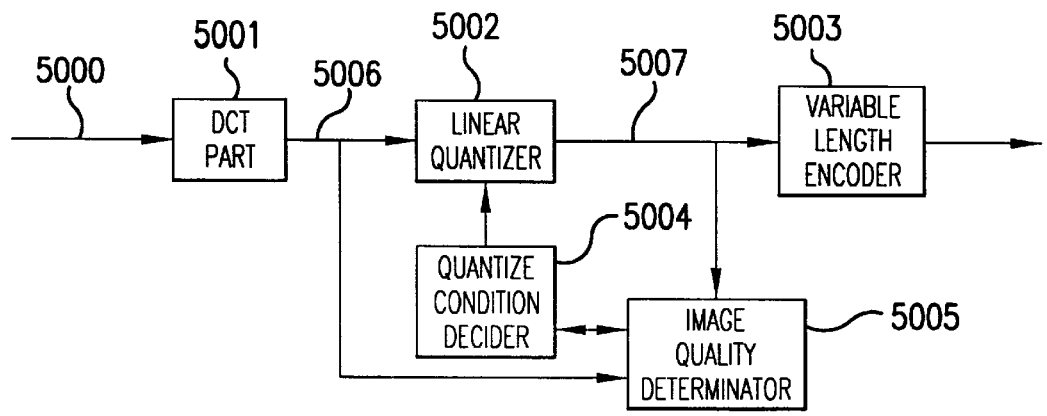
FIG. 17 is a block diagram schematically illustrating an encoding device having an image-quality control function, according to a conventional example 1.
Figure 18:
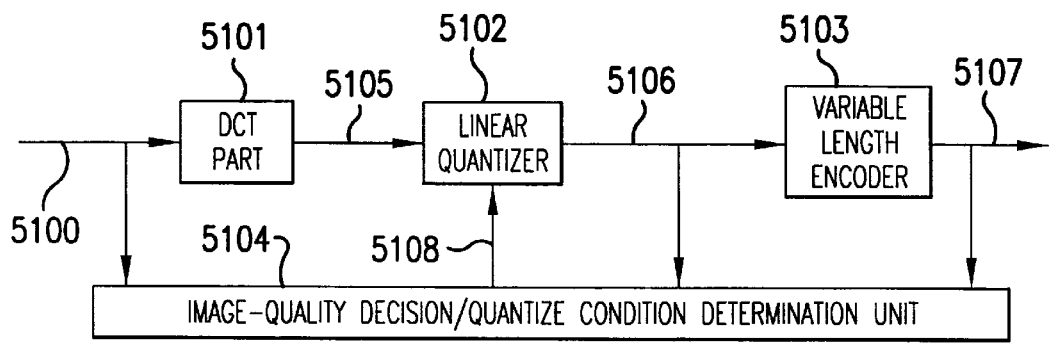
FIG. 18 is a block diagram schematically depicting an encoding device having an image-quality control function, according to a conventional example 2.
Figure 19:
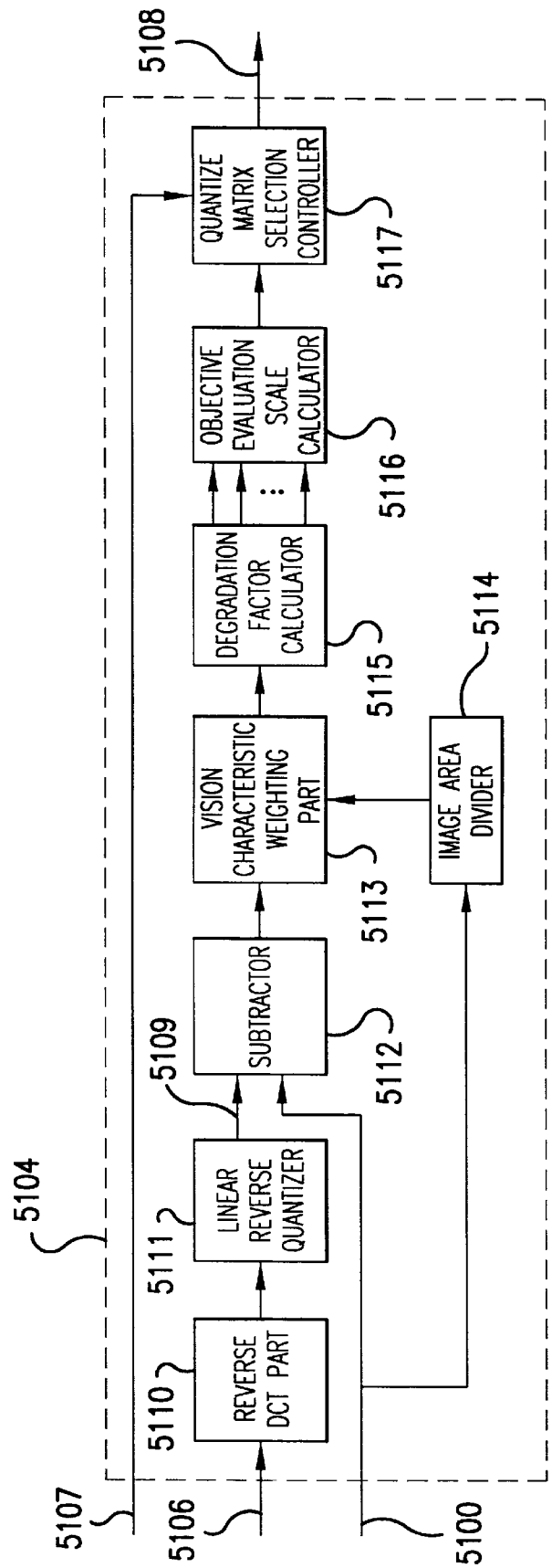
FIG. 19 is a block diagram schematically showing an image-quality decision/quantize condition determination unit employed in the conventional example 2.
Figure 20:
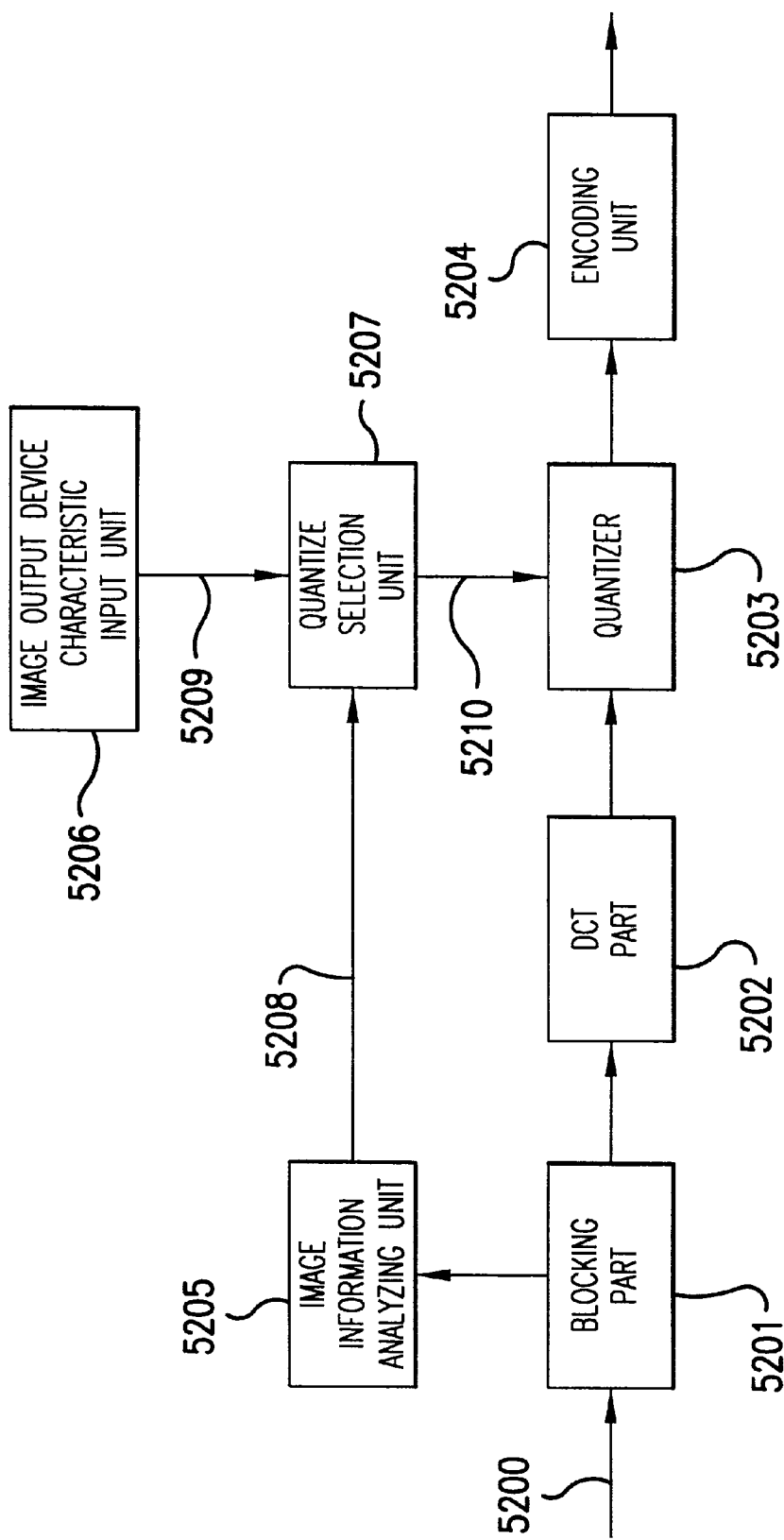
FIG. 20 is a block diagram schematically illustrating an encoding device having an image-quality control function, according to a conventional example 3.
Figure 21:
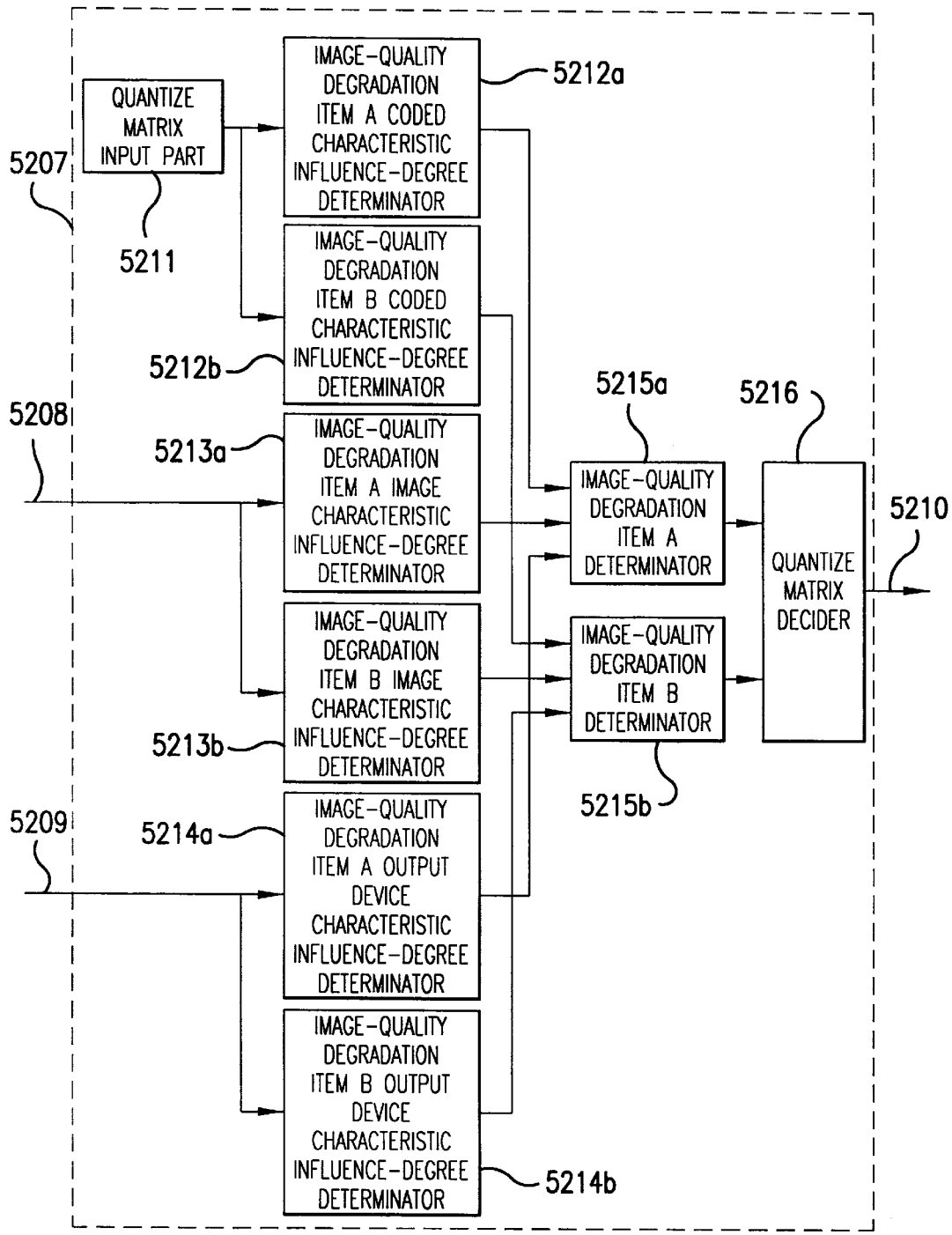
FIG. 21 is a block diagram schematically depicting a quantize selection unit employed in the conventional example 3.

FIG. 16 shows a configuration of a coding parameter determination unit 108 employed in a sixth embodiment of the present invention. The present embodiment is identical, in terms of overall configuration, to the embodiment shown in FIG. 10. The present embodiment is different from the third embodiment only in the configuration of the coding parameter determination unit 108.

The coding parameter determination unit 108 shown in FIG. 16 will be described. In FIG. 16, reference numeral 1300 indicates a weighting factor determinator or decider and reference numeral 1301 indicates a coding parameter calculator. The weighting factor decider 1300 determines weighting information for calculating a coding parameter based on output device characteristic information 107 and coding characteristic information 701. The coding parameter calculator 1301 performs a weighting process on image analysis information 104, based on the weighting factor information outputted from the weighting factor decider 1300, and outputs a coding parameter 109 therefrom.

According to the present invention, as is evident from the above description, an encoding device for performing image-quality control using an input image characteristic, a coding device characteristic and an image output device characteristic can provide an encoding technique for implementing highly accurate image-quality control with a small-scale device configuration by using analysis information on peripheral regions or areas upon an image analysis. Further, when color image information composed of a plurality of color components is encoded every color components, analyzing time can be reduced using a high correlation between color components of input image analysis information and information processing can be performed at a high speed, and a compression rate can be improved by utilizing the degree of the influence on image quality for each color component.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An image information encoding device comprising:

image information dividing means for dividing image information into a plurality of pieces of divided image information;

image analysis information input means for inputting image analysis information related to the rate of generation of at least one image-quality degradation item of said divided image information;

image output device characteristic input means for inputting image output device characteristic information related to the rate of generation of at least one image-quality degradation item;

codingcoded parameter determining means for determining each of coding parameters; and image information encoding means for encoding said divided image information by using the coding parameter outputted from said coding parameter determining means;

wherein said coed parameter determining means determines the coding parameter, based on the image analysis information inputted from said image analysis information input means and the image output device characteristic information inputted from said image output device characteristic input means so that decoded and divided image information corresponding to a result obtained by coding and decoding said divided image information reaches target image quality; and said image analysis information input means has image analyzing means, image analysis information holding means and image analysis information weighting means, said image analyzing means calculates image analysis information and inputs the same to said image analysis information holding means and said image analysis information weighting means, said image analysis information holding means stores the image analysis information inputted from said image analyzing means into a predetermined place, said image analysis information holding means reading peripheral image analysis information corresponding to image analysis information on divided image information located around the corresponding divided image information being analyzed by said image analyzing means from a predetermined place and inputting the read information to said image analysis information weighting means, and said image analysis information weighting means performs a predetermined weighting process on the image analysis information inputted from said image analyzing means and the peripheral image analysis information inputted from said image analysis information holding means, and inputs the result of processing to said coding parameter determining means as image analysis information.

2. An image information encoding device comprising:

image information dividing means for dividing image information into a plurality of pieces of divided image information;

image analysis information input means for inputting image analysis information related to the rate of generation of at least one image-quality degradation item of said divided image information;

image output device characteristic input means for inputting image output device characteristic information related to the rate of generation of at least one image-quality degradation item;

coded parameter determining means for determining each of coding parameters; and image information encoding means for encoding said divided image information by using the coding parameter outputted from said coding parameter determining means;

wherein said coding parameter determining means determines the coding parameter, based on the image analysis information inputted from said image analysis information input means and the image output device characteristic information inputted from said image output device characteristic input means so that decoded and divided image information corresponding to a result obtained by coding and decoding the divided image information reaches target image quality; and said image analysis information input means has image analyzing means, area analysis information calculating means, area analysis information holding means and area analysis weighting means, said image analyzing means calculates image analysis information, said area analysis information calculating means calculates area analysis information on area image information comprised of a plurality of pieces of the divided image information, based on a plurality of pieces of image analysis information inputted from said image analyzing means and inputs the calculated area analysis information to said area analysis information holding means and said area analysis information weighting means, said area analysis information holding means stores each of the area analysis information inputted from said area analysis information calculating means into a predetermined place, said area analysis information holding means reading peripheral area analysis information corresponding to area analysis information on area image information located around the corresponding area image information being analyzed by said area analysis information calculating means from a predetermined place and inputting the read information to said area analysis information weighting means, and said area analysis information weighting means performs a predetermined weighting process on the area analysis information inputted from said area analysis information calculating means and the peripheral area analysis information inputted from said area analysis information holding means, and inputs the result of processing to said coding parameter determining means as area analysis information.

3. The image information encoding device according to claim 1, wherein said image analysis information input means has image analyzing means, and image analysis information holding means, said image analysis information input means analyzes image information about specific color components through the use of said image analyzing means when said image information comprises a plurality of color components, inputs the resultant image analysis information to said coding parameter determining means and allows said image analysis information holding means to store the image analysis information, and said image analysis information input means reads the image analysis information about the specific color components, identical in position relation therebetween from said image analysis information holding means in the case of image information on other color components, and inputs the read image analysis information to said coding parameter determining means.

4. The image information encoding device according to claim 1, wherein said image analysis information input means has image analyzing means, image analysis information holding means, and image analysis information weighting means, said image analysis information input means analyzes image information about specific color components through the use of said image analyzing means when said image information comprises a plurality of color components, inputs the resultant image analysis information to said coding parameter determining means and allows said image analysis information holding means to store the image analysis information, and said image analysis information input means reads the image analysis information about the specific color components, identical in position relation therebetween from said image analysis information holding means in the case of image information on other color components, assigns predetermined weights to the read image analysis information by using said image analysis information weighting means, and thereafter inputs the so-processed information to said coding parameter determining means.

5. The image information encoding device according to claim 1, wherein said coding parameter determining means has a plurality of image-quality degradation item-by-item coding parameter calculating means related to generation rates of image-quality degradation items and further includes coding parameter selecting means for selecting one of a plurality of coding parameters outputted from said image-quality degradation item-by-item coding parameter calculating means, said coding parameter determining means reading a coding parameter from said image-quality degradation item-by-item coding parameter holding means based on the image analysis information inputted from said image analysis information input means and the image output device characteristic information inputted from said image output device characteristic input means and selecting the most undegraded one from said plurality of coding parameters by using said coding parameter selecting means.

6. The image information encoding device according to claim 1, wherein said coding parameter determining means has weighting factor determining means and coding parameter calculating means, and said weighting factor determining means determines weighting factor for calculating a coding parameter, based on said output device characteristic information related to the rate of generation of at least one image-quality degradation item and said coding parameter calculating means performs a weighting process on said image analysis information related to the rate of generation of at least one image-quality degradation item, based on a weighting factor outputted from said weighting factor determining means to thereby calculate a coding parameter.

7. The image information encoding device according to claim 1, further including coded characteristic input means for inputting the encoding device characteristic information outputted from said encoding means, and said coded characteristic input means inputs coded characteristic information of said image encoding device, related to the rate of generation of at least one image-quality degradation item, and said coding parameter determining means determines the coding parameter, based on the image analysis information inputted from said image analysis information input means, the image output device characteristic information inputted from said image information output device characteristic input means and the coded characteristic information inputted from said coded characteristic input means so that decoded and divided image information corresponding to a result obtained by coding and decoding the divided image information reaches target image quality.

8. The image information encoding device according to claim 7, wherein said coding parameter determining means has a plurality of image-quality degradation item-by-item coding parameter holding means related to generation rates of image-quality degradation items and further includes coding parameter selecting means for selecting one of a plurality of coding parameters read from said image-quality degradation item-by-item coding parameter holding means, said coding parameter determining means reading coding parameters from said image-quality degradation item-by-item coding parameter holding means based on the image analysis information inputted from said image analysis information input means, the image output device characteristic information inputted from said image output device characteristic input means and the coded characteristic information inputted from said coded characteristic input means and selecting the most undegraded one from said plurality of coding parameters by using said coding parameter selecting means.

9. The image information encoding device according to claim 7, wherein said coding parameter determining means has weighting factor determining means and coding parameter calculating means, and said weighting factor determining means determines weighting factor for calculating a coding parameter, based on the output device characteristic information related to the rate of generation of at least one image-quality degradation item and the coded characteristic information related to the rate of generation of at least one image-quality degradation item and said coding parameter calculating means performs a weighting process on the image analysis information related to the rate of generation of at least one image-quality degradation item, based on a weighting factor outputted from said weighting factor determining means to thereby calculate a coding parameter.

10. The image information encoding device according to claim 1, wherein said image output device characteristic input means has image output device characteristic holding means related to the rate of generation of at least one image-quality degradation item and reads the image output device characteristic from said image output device characteristic holding means based on image output device information inputted from the outside.

* * * * *